US012738679B2

(12) United States Patent
Lee et al.

(10) Patent No.: US 12,738,679 B2
(45) Date of Patent: Sep. 15, 2026

(54) ELECTRICAL CONNECTION PROTECTION SYSTEM, ELECTRICAL PROTECTION CONNECTING HEAD, ELECTRICAL DEVICE AND POWER SUPPLY APPARATUS

(71) Applicant: TECHTRONIC CORDLESS GP, Anderson, SC (US)

(72) Inventors: Hei Man Lee, Hong Kong (CN); Nan Wang, Dongguan City (CN)

(73) Assignee: Techtronic Cordless GP, Anderson, SC (US)

( * ) Notice: Subject to any disclaimer, the term of this patent is extended or adjusted under 35 U.S.C. 154(b) by 522 days.

(21) Appl. No.: 18/320,364

(22) Filed: May 19, 2023

(65) Prior Publication Data

US 2023/0420876 A1 Dec. 28, 2023

(30) Foreign Application Priority Data

Jun. 23, 2022 (CN) ......................... 202210726439.7

(51) Int. Cl.
*H01R 13/04* (2006.01)
*H01R 13/502* (2006.01)

(52) U.S. Cl.
CPC ........... *H01R 13/04* (2013.01); *H01R 13/502* (2013.01)

(58) Field of Classification Search
CPC ...... H01R 13/04; H01R 13/502; H01R 31/06; H01R 13/53; H01R 13/6485; H01R 13/44;

(Continued)

(56) References Cited

U.S. PATENT DOCUMENTS 5,977,746 A 11/1999 Hershberger et al.
7,504,179 B2 3/2009 Tanjou et al.

(Continued)

FOREIGN PATENT DOCUMENTS

CN 104752666 B 5/2017
CN 106785199 B 3/2019

(Continued)

OTHER PUBLICATIONS

US 9,698,395 B2, 07/2017, Kusunoki et al. (withdrawn)

(Continued)

*Primary Examiner* — Abdullah A Riyami
*Assistant Examiner* — Nader J Alhawamdeh
(74) *Attorney, Agent, or Firm* — Michael Best & Friedrich LLP

(57) ABSTRACT

The present invention relates to the technical field of electrical connection protection, disclosing an electrical connection protection system, an electrical protection connecting head, an electrical device and a power supply apparatus. The electrical connection protection system comprises a first connection end for a power supply apparatus and a second connection end for an electrical device, the first connection end and the second connection end respectively comprising positive pole terminals capable of contacting each other to establish an electrical connection and negative pole terminals capable of contacting each other to establish an electrical connection, wherein when the first connection end and the second connection end are connected, the negative pole terminals of the first connection end and the second connection end contact each other before the positive pole terminals of the first connection end and the second connection end. Thus, an inrush current can be prevented from arising at the instant when the power supply apparatus and the electric device are connected, in order to prevent damage (Continued)

to internal electrical components of the electrical device and the power supply apparatus.

21 Claims, 5 Drawing Sheets

(58) Field of Classification Search
CPC ...... H01R 13/02; H01R 13/22; H01R 13/648; Y02E 60/10
See application file for complete search history.

(56) References Cited

U.S. PATENT DOCUMENTS

| | | | | |
|---|---|---|---|---|
| 8,007,933 | B2 * | 8/2011 | Takagi | H01M 50/325 429/57 |
| 8,062,785 | B2 | 11/2011 | Kishii et al. | |
| 8,124,262 | B2 | 2/2012 | Okada et al. | |
| 8,415,040 | B2 | 4/2013 | Yoon | |
| 8,679,660 | B2 | 3/2014 | Kawai | |
| 8,709,644 | B2 | 4/2014 | Maguire et al. | |
| 8,778,530 | B2 | 7/2014 | Kim | |
| 8,999,555 | B2 | 4/2015 | Kume et al. | |
| 9,023,514 | B2 | 5/2015 | Tatehata et al. | |
| 9,224,997 | B2 | 12/2015 | Osswald | |
| 9,240,591 | B2 | 1/2016 | Inagaki et al. | |
| 9,281,506 | B2 | 3/2016 | Holung et al. | |
| 9,508,977 | B2 | 11/2016 | Tatehata et al. | |
| 9,531,103 | B2 | 12/2016 | Fujita et al. | |
| 9,536,672 | B2 | 1/2017 | Kobayashi et al. | |
| 9,537,190 | B2 | 1/2017 | Maguire et al. | |
| 9,627,665 | B1 | 4/2017 | Hsu et al. | |
| 9,667,006 | B2 | 5/2017 | Waigel et al. | |
| 9,722,230 | B2 | 8/2017 | Fujiwara et al. | |
| 9,780,582 | B2 | 10/2017 | Schmid et al. | |
| 9,825,263 | B2 | 11/2017 | Tatehatav | |
| 9,887,401 | B2 | 2/2018 | Aston et al. | |
| 9,887,410 | B2 | 2/2018 | Zhou | |
| 10,020,503 | B2 | 7/2018 | Inagaki et al. | |
| 10,044,011 | B2 | 8/2018 | Peng et al. | |
| 10,069,128 | B2 | 9/2018 | Harayama | |
| 10,109,840 | B2 | 10/2018 | Gaul et al. | |
| 10,230,077 | B2 | 3/2019 | Rief et al. | |
| 10,243,181 | B2 | 3/2019 | Zhao et al. | |
| 10,243,182 | B2 | 3/2019 | Zhu et al. | |
| 10,243,186 | B2 | 3/2019 | Kruger | |
| 10,333,129 | B2 | 6/2019 | Zhao | |
| 10,374,272 | B1 | 8/2019 | Dellon et al. | |
| 10,468,648 | B2 | 11/2019 | Ikeda et al. | |
| 10,505,166 | B2 | 12/2019 | Kusunoki et al. | |
| 10,511,026 | B2 | 12/2019 | Fukasawa et al. | |
| 10,522,928 | B1 | 12/2019 | Tang et al. | |
| 10,529,969 | B2 | 1/2020 | Ogawa et al. | |
| 10,559,798 | B2 | 2/2020 | Qin et al. | |
| 10,615,410 | B2 | 4/2020 | Essaki et al. | |
| 10,741,804 | B2 | 8/2020 | Mitsuhashi | |
| 10,847,772 | B2 | 11/2020 | Kruger | |
| 10,892,626 | B2 | 1/2021 | Rief et al. | |
| 10,957,894 | B2 | 3/2021 | Patterson et al. | |
| 11,205,820 | B2 | 12/2021 | Hanawa et al. | |
| 11,302,997 | B2 | 4/2022 | Wynn et al. | |
| 2006/0292419 | A1 * | 12/2006 | Shen | H05K 1/16 429/82 |
| 2010/0047673 | A1 | 2/2010 | Hirakawa et al. | |
| 2010/0291426 | A1 | 11/2010 | Zhou | |
| 2011/0177366 | A1 | 7/2011 | Nagasaki et al. | |
| 2011/0200862 | A1 | 8/2011 | Kurosawa | |
| 2012/0034507 | A1 * | 2/2012 | Harada | B60L 58/26 429/120 |
| 2012/0244399 | A1 | 9/2012 | Tartaglia | |
| 2015/0042280 | A1 | 2/2015 | Rief et al. | |
| 2015/0044519 | A1 | 2/2015 | Rief et al. | |
| 2015/0050531 | A1 | 2/2015 | Felser et al. | |
| 2015/0050532 | A1 | 2/2015 | Waigel et al. | |
| 2015/0050539 | A1 | 2/2015 | Peterl et al. | |
| 2015/0246650 | A1 | 9/2015 | Nakajima et al. | |
| 2016/0211499 | A1 | 7/2016 | Cho | |
| 2016/0301109 | A1 | 10/2016 | Peng et al. | |
| 2019/0148706 | A1 | 5/2019 | Ohnishi | |
| 2019/0259984 | A1 | 8/2019 | Nishikawa et al. | |
| 2019/0260209 | A1 | 8/2019 | Nishikawa et al. | |
| 2019/0273292 | A1 | 9/2019 | Hald et al. | |
| 2019/0312323 | A1 | 10/2019 | Dellon et al. | |
| 2019/0355941 | A1 | 11/2019 | Hacker et al. | |
| 2019/0386271 | A1 | 12/2019 | Ogawa et al. | |
| 2019/0393472 | A1 | 12/2019 | Kobayashi | |
| 2020/0058913 | A1 | 2/2020 | Kusunoki et al. | |
| 2020/0067056 | A1 | 2/2020 | Wynn et al. | |
| 2020/0076022 | A1 | 3/2020 | Kawakami et al. | |
| 2020/0212505 | A1 | 7/2020 | Nakano et al. | |
| 2020/0358058 | A1 | 11/2020 | Murayama et al. | |
| 2020/0365855 | A1 | 11/2020 | Murayama et al. | |
| 2021/0028424 | A1 | 1/2021 | Schuessler et al. | |
| 2021/0050573 | A1 | 2/2021 | Lee | |
| 2021/0143508 | A1 | 5/2021 | Yoshida | |
| 2021/0167345 | A1 | 6/2021 | Kwag | |
| 2021/0305661 | A1 | 9/2021 | Gyoda | |
| 2022/0131210 | A1 | 4/2022 | Botadra et al. | |
| 2022/0158291 | A1 | 5/2022 | Frick et al. | |
| 2022/0158295 | A1 | 5/2022 | Kotik et al. | |
| 2022/0181756 | A1 | 6/2022 | Kotik et al. | |
| 2022/0190445 | A1 | 6/2022 | Wynn et al. | |
| 2022/0190452 | A1 | 6/2022 | Botadra et al. | |
| 2022/0255170 | A1 | 8/2022 | Kotik et al. | |
| 2023/0420876 | A1 * | 12/2023 | Lee | H01R 13/6485 |

FOREIGN PATENT DOCUMENTS

| | | | | |
|---|---|---|---|---|
| CN | 210607532 | U | | 5/2020 |
| CN | 211605582 | U | * | 9/2020 |
| CN | 212542592 | U | | 2/2021 |
| CN | 112467299 | A | | 3/2021 |
| CN | 112635887 | A | | 4/2021 |
| CN | 112928358 | A | | 6/2021 |
| CN | 214625627 | U | | 11/2021 |
| DE | 102013102647 | A1 | | 9/2014 |
| DE | 102015210988 | A1 | | 12/2016 |
| DE | 202017006869 | U1 | | 8/2018 |
| DE | 102019102459 | A1 | | 8/2020 |
| EP | 3439116 | A1 | | 2/2019 |
| GB | 2568957 | B | | 6/2020 |
| WO | 2009152660 | A1 | | 12/2009 |
| WO | 2012014348 | A1 | | 2/2012 |
| WO | 2012101954 | A1 | | 8/2012 |
| WO | 2013121990 | A1 | | 8/2013 |
| WO | 2014122975 | A1 | | 8/2014 |
| WO | 2017014470 | A1 | | 1/2017 |
| WO | 2018179794 | A1 | | 10/2018 |
| WO | 2020042411 | A1 | | 3/2020 |
| WO | 2020097842 | A1 | | 5/2020 |
| WO | 2020174804 | A1 | | 9/2020 |

OTHER PUBLICATIONS

Extended European Search Report for Application No. 23177196.5 dated Nov. 24, 2023 (12 pages).

European Patent Office Action for Application No. 23177196.5 dated Nov. 17, 2025 (10 pages).

* cited by examiner

ELECTRICAL CONNECTION PROTECTION SYSTEM, ELECTRICAL PROTECTION CONNECTING HEAD, ELECTRICAL DEVICE AND POWER SUPPLY APPARATUS

TECHNICAL FIELD

The present invention relates to the technical field of electrical connection protection, in particular to an electrical connection protection system, an electrical protection connecting head, an electrical device and a power supply apparatus.

BACKGROUND ART

Electrical devices such as electric tools generally comprise a housing, a motor, a motive power transmission mechanism, a working head mounting sleeve, a circuit board and a battery apparatus, wherein the circuit board, motor, motive power transmission mechanism and working head mounting sleeve are disposed in the housing. For example, the motor, motive power transmission mechanism and working head mounting sleeve are arranged in the housing along the same central axis to form a linear structure, with the working head mounting sleeve located at a front end of the housing for the purpose of mounting the required working head. The circuit board is connected to the motor to control the operation of the motor, e.g. to control the supply of power to the motor. In addition, a battery apparatus connection port is provided on the housing, and the battery apparatus is removably plugged into the battery apparatus connection port so as to form an electrical connection with the circuit board; at this time, the circuit board is able to control the supply of power from the battery apparatus to the motor.

However, in actual use, at the instant when the battery apparatus is plugged into the battery apparatus connection port, an inrush current will arise, and such an inrush current will cause a shock to the motor. At present, the inrush current is usually suppressed by providing a variety of suppression components on the circuit board. For example, a resistor may be connected in series with a power supply input line, or an NTC thermistor may be connected in series with the power supply input line.

SUMMARY OF THE INVENTION

In a first aspect, the present invention provides an electrical connection protection system, comprising a first connection end for a power supply apparatus and a second connection end for an electrical device, the first connection end and the second connection end respectively comprising positive pole terminals capable of contacting each other to establish an electrical connection and negative pole terminals capable of contacting each other to establish an electrical connection, wherein when the first connection end and the second connection end are connected, the negative pole terminals of the first connection end and the second connection end contact each other before the positive pole terminals of the first connection end and the second connection end.

In this technical solution, the first connection end and second connection end respectively comprise positive pole terminals capable of contacting each other to establish an electrical connection and negative pole terminals capable of contacting each other to establish an electrical connection, and when the first connection end and the second connection end are connected, the negative pole terminals of the first connection end and the second connection end contact each other before the positive pole terminals of the first connection end and the second connection end. Thus, an inrush current can be prevented from arising at the instant when the power supply apparatus and the electric device are connected, in order to prevent damage to internal electrical components of the electrical device and the power supply apparatus. For example, damage to respective signal terminals in a battery connection port and a battery apparatus can be prevented, thus increasing the safety and service life of the power supply apparatus and electrical device (e.g. battery apparatus and electric tool).

In some embodiments, the negative pole terminal of the power supply apparatus has a greater height than the positive pole terminal of the power supply apparatus.

In some embodiments, the first connection end and the second connection end respectively comprise signal terminals capable of contacting each other to realize a communicative connection, wherein the positive pole terminals contact each other and the negative pole terminals contact each other before the signal terminals contact each other.

Furthermore, the first connection end and/or the second connection end comprise(s) a signal terminal mounting zone enclosed by an isolating sidewall; the signal terminal mounting zone is located between the positive pole terminal and the negative pole terminal, and the signal terminal is disposed in the signal terminal mounting zone.

In some embodiments, at least one of the first connection end and the second connection end comprises a terminal mounting base, with the negative pole terminal and the positive pole terminal disposed on the terminal mounting base, wherein the negative pole terminal has a greater height than the positive pole terminal.

Furthermore, the terminal mounting base comprises a positive pole terminal mounting insulative member and a negative pole terminal mounting insulative member which are spaced apart; the positive pole terminal mounting insulative member has a positive pole terminal accommodating part allowing the positive pole terminal to be exposed, and the negative pole terminal mounting insulative member has a negative pole terminal accommodating part allowing the negative pole terminal to be exposed, the negative pole terminal accommodating part being higher than the positive pole terminal accommodating part in a terminal plug-in direction.

Furthermore, the terminal mounting base comprises a connecting part and a port part, wherein the connecting part is configured to be connectable to a housing of the power supply apparatus so that the port part forms an external connection port of the power supply apparatus; the port part comprises a mounting face, and the positive pole terminal mounting insulative member and the negative pole terminal mounting insulative member are spaced apart on the mounting face.

Furthermore, the negative pole terminal accommodating part is a negative pole terminal accommodating slot formed on an outer surface of the negative pole terminal mounting insulative member, the mounting face is provided with a negative pole terminal penetration socket corresponding to the negative pole terminal accommodating slot in the terminal plug-in direction, and the negative pole terminal penetrates the negative pole terminal penetration socket; the positive pole terminal accommodating part is a positive pole terminal accommodating slot formed on an outer surface of the positive pole terminal mounting insulative member, the mounting face is provided with a positive pole terminal penetration socket corresponding to the positive pole terminal accommodating slot in the terminal plug-in direction, and the positive pole terminal penetrates the positive pole terminal penetration socket.

Furthermore, the negative pole terminal mounting insulative member is a negative pole terminal mounting plate, and the negative pole terminal accommodating slots are respectively formed on two side plate faces of the negative pole terminal mounting plate; the positive pole terminal mounting insulative member is a positive pole terminal mounting plate, and the positive pole terminal accommodating slots are respectively formed on two side plate faces of the positive pole terminal mounting plate, wherein the positive pole terminal mounting insulative member and the negative pole terminal mounting insulative member have the same height in the terminal plug-in direction.

In some embodiments, the terminal mounting base comprises isolating plates located between the positive pole terminal and the negative pole terminal; the number of the isolating plates is two, and these are spaced apart to isolate the positive pole terminal from the negative pole terminal, wherein a signal terminal mounting zone is formed between the two isolating plates, and the signal terminal is provided in the signal terminal mounting zone.

Furthermore, the terminal mounting base comprises an annular sidewall extending in the terminal plug-in direction; the two isolating plates are connected to the sidewall at two ends in a plate face extension direction, so that a positive pole zone is formed between the sidewall and one of the isolating plates, and a negative pole zone is formed between the sidewall and the other isolating plate, wherein the positive pole terminal is located in the positive pole zone, and the negative pole terminal is located in the negative pole zone.

In some embodiments, a positioning plate is formed on a plate face of one of the isolating plates that faces toward the other isolating plate, the positioning plate extending perpendicularly toward the other isolating plate, wherein signal terminal sockets located at two sides of the positioning plate, and multiple signal terminal sockets spaced apart close to the other isolating plate, are formed in the signal terminal mounting zone.

Furthermore, the power supply apparatus is a battery apparatus and the electrical device is an electric tool; or the power supply apparatus is a charger and the electrical device is a battery apparatus; or the power supply apparatus is a power cord and the electrical device is an electric tool.

In a second aspect, the present invention provides an electrical protection connecting head, wherein the electrical protection connecting head is configured to be able to establish an electrical connection between a power supply apparatus and an electrical device; the electrical protection connecting head comprises a terminal mounting base, and a negative pole terminal and a positive pole terminal disposed on the terminal mounting base, wherein the negative pole terminal has a greater height than the positive pole terminal, so that when an electrical connection is established between the power supply apparatus and the electrical device, the negative pole terminal experiences contact before the positive pole terminal.

In this technical solution, because the negative pole terminal disposed on the terminal mounting base has a greater height than the positive pole terminal, once the electrical protection connecting head has been disposed on the power supply apparatus and/or the electrical device, the negative pole terminal will experience contact before the positive pole terminal when an electrical connection is established between the power supply apparatus and the electrical device. This can prevent an inrush current from arising at the instant when the power supply apparatus and the electrical device are connected, in order to prevent damage to internal electrical components of the electrical device and the power supply apparatus. For example, damage to the respective signal terminals in the battery connection port and the battery apparatus can be prevented, thus increasing the safety and service life of the power supply apparatus and electrical device (e.g. battery apparatus and electric tool).

In some embodiments, the terminal mounting base comprises a positive pole terminal mounting insulative member and a negative pole terminal mounting insulative member which are spaced apart; the positive pole terminal mounting insulative member has a positive pole terminal accommodating part allowing the positive pole terminal to be exposed, and the negative pole terminal mounting insulative member has a negative pole terminal accommodating part allowing the negative pole terminal to be exposed, the negative pole terminal accommodating part being higher than the positive pole terminal accommodating part in a terminal plug-in direction.

Furthermore, the terminal mounting base comprises a connecting part and a port part, wherein the connecting part is configured to be connectable to a housing of the power supply apparatus so that the port part forms an external connection port of the power supply apparatus; the port part comprises a mounting face, and the positive pole terminal mounting insulative member and the negative pole terminal mounting insulative member are spaced apart on the mounting face.

Furthermore, the negative pole terminal accommodating part is a negative pole terminal accommodating slot formed on an outer surface of the negative pole terminal mounting insulative member, the mounting face is provided with a negative pole terminal penetration socket corresponding to the negative pole terminal accommodating slot in the terminal plug-in direction, and the negative pole terminal penetrates the negative pole terminal penetration socket;

the positive pole terminal accommodating part is a positive pole terminal accommodating slot formed on an outer surface of the positive pole terminal mounting insulative member, the mounting face is provided with a positive pole terminal penetration socket corresponding to the positive pole terminal accommodating slot in the terminal plug-in direction, and the positive pole terminal penetrates the positive pole terminal penetration socket.

Furthermore, the negative pole terminal mounting insulative member is a negative pole terminal mounting plate, and the negative pole terminal accommodating slots are respectively formed on two side plate faces of the negative pole terminal mounting plate; the positive pole terminal mounting insulative member is a positive pole terminal mounting plate, and the positive pole terminal accommodating slots are respectively formed on two side plate faces of the positive pole terminal mounting plate, wherein the positive pole terminal mounting insulative member and the negative pole terminal mounting insulative member have the same height in the terminal plug-in direction.

In some embodiments, the terminal mounting base comprises isolating plates located between the positive pole terminal and the negative pole terminal; the number of the isolating plates is two, and these are spaced apart to isolate the positive pole terminal from the negative pole terminal, wherein a signal terminal mounting zone is formed between the two isolating plates.

Furthermore, the terminal mounting base comprises an annular sidewall extending in the terminal plug-in direction; the two isolating plates are connected to the sidewall at two ends in a plate face extension direction, so that a positive pole zone is formed between the sidewall and one of the isolating plates, and a negative pole zone is formed between the sidewall and the other isolating plate, wherein the positive pole terminal is located in the positive pole zone, and the negative pole terminal is located in the negative pole zone.

Furthermore, a positioning plate is formed on a plate face of one of the isolating plates that faces toward the other isolating plate, the positioning plate extending perpendicularly toward the other isolating plate, wherein signal terminal sockets located at two sides of the positioning plate, and multiple signal terminal sockets spaced apart close to the other isolating plate, are formed in the signal terminal mounting zone.

In a third aspect, the present invention provides an electrical device, which is provided with any of the electrical protection connecting heads described in the second aspect above. As stated above, because an inrush current is prevented, the safety and service life of the electrical device, e.g. electric tool are increased, such that the overall quality of the electrical device is favorably improved.

The electrical device may be an electric tool.

In a fourth aspect, the present invention provides a power supply apparatus, which is provided with any of the electrical protection connecting heads described in the second aspect above. As stated above, because an inrush current is prevented, the safety and service life of the power supply apparatus, e.g. battery apparatus are increased, such that the overall quality of the power supply apparatus is favorably improved.

The power supply apparatus is a battery apparatus or a charger.

In a fifth aspect, the present invention provides the use, in an electrical device or power supply apparatus, of any of the electrical protection connecting heads in the second aspect above, wherein the electrical protection connecting head is disposed at a connection end of the electrical device or power supply apparatus. In some embodiments, the electrical device is an electric tool. In some embodiments, the power supply apparatus is a battery apparatus. In some embodiments, the power supply apparatus is a charger.

Other features and aspects of the present invention will become clear and easy to understand if the drawings and detailed description below are considered.

Figure 1:
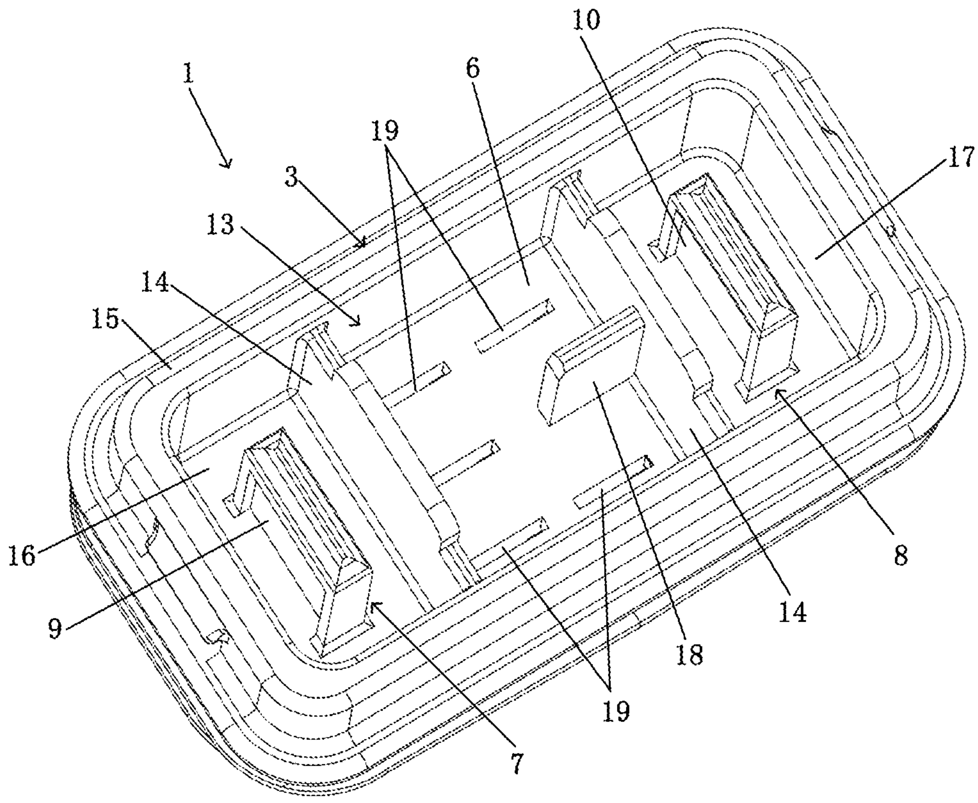
FIG. 1 is a schematic 3D structural drawing of a terminal mounting base of an electrical connection protection system or electrical protection connecting head according to an embodiment of the present application, viewed from one angle.

Before any embodiment of the present invention is explained in detail, it should be understood that application of the present invention is not limited to the details of arrangement and structure of the components described in the description below or shown in the drawings below. The present invention may have other embodiments and may be implemented or executed in various ways. In addition, it should be understood that the wording and terms used herein are intended for description purposes and should not be regarded as limiting.

DETAILED DESCRIPTION OF THE INVENTION

In the detailed description of embodiments below, an explanation is provided with reference to the drawings, which form part of the description. The drawings show demonstratively specific embodiments in which the present invention is implemented. The embodiments shown are not intended to exhaust all embodiments according to the present invention. It will be understood that other embodiments may be used, and structural or logical changes may be made without departing from the scope of the present invention. In relation to the drawings, directional terms such as "down", "up", "left", "right", etc. are used with reference to the orientations of the drawings described. As components of embodiments of the present invention can be implemented in various orientations, these directional terms are used for illustrative rather than restrictive purposes. Thus, the specific embodiments below are not intended as a limitation, and the scope of the present invention is defined by the attached claims.

In a first aspect, the present invention provides an electrical connection protection system, comprising a first connection end for a power supply apparatus and a second connection end for an electrical device, the first connection end and second connection end respectively comprising positive pole terminals capable of contacting each other to establish an electrical connection and negative pole terminals capable of contacting each other to establish an electrical connection, wherein when the first connection end and the second connection end are connected, the negative pole terminals of the first connection end and the second connection end contact each other before the positive pole terminals of the first connection end and the second connection end.

In this technical solution, the first connection end and second connection end respectively comprise positive pole terminals capable of contacting each other to establish an electrical connection and negative pole terminals capable of contacting each other to establish an electrical connection, and when the first connection end and the second connection end are connected, the negative pole terminals of the first connection end and the second connection end contact each other before the positive pole terminals of the first connection end and the second connection end. Thus, in actual use, an inrush current can be prevented from arising at the instant when the power supply apparatus and the electric device are connected, in order to prevent damage to internal electrical components of the electrical device and the power supply apparatus. For example, damage to respective signal terminals in a battery connection port and a battery apparatus can be prevented, thus increasing the safety and service life of the power supply apparatus and electrical device, e.g. the battery apparatus and electric tool.

In the electrical connection protection system, in some embodiments, the negative pole terminal 11 of the power supply apparatus has a greater height than the positive pole terminal 12 of the power supply apparatus, in which case the negative pole terminal of the electrical device may have a greater height than the positive pole terminal of the electrical device, or the same height as the positive pole terminal of the electrical device. Thus, when the first connection end and second connection end are connected, their respective negative pole terminals will contact each other before their respective positive pole terminals. Optionally, in other embodiments, the negative pole terminal of the electrical device has a greater height than the positive pole terminal of the electrical device, in which case the negative pole terminal of the power supply apparatus may have a greater height than the positive pole terminal of the power supply apparatus, or the same height as the positive pole terminal of the power supply apparatus; likewise, when the first connection end and second connection end are connected, their respective negative pole terminals will contact each other before their respective positive pole terminals.

Of course, other configurations may be used in the electrical connection protection system to achieve a result whereby, when the first connection end and second connection end are connected, their respective negative pole terminals contact each other before their respective positive pole terminals. For example, in one configuration, the positive pole terminals have the same height as the negative pole terminals, but front end parts of the positive pole terminals are covered by an insulating layer. Thus, when the first connection end and second connection end are connected, even if their respective positive pole terminals come into contact at the same time as their respective negative pole terminals, the front ends of their respective positive pole terminals do not come into direct electrical contact, due to the presence of the insulating layer. At this time, their respective negative pole terminals come into direct electrical contact, and their respective positive pole terminals only establish electrical contact with continued movement. Thus, this configuration can likewise achieve a result whereby, when the first connection end and second connection end are connected, their respective negative pole terminals contact each other before their respective positive pole terminals.

Figure 5:
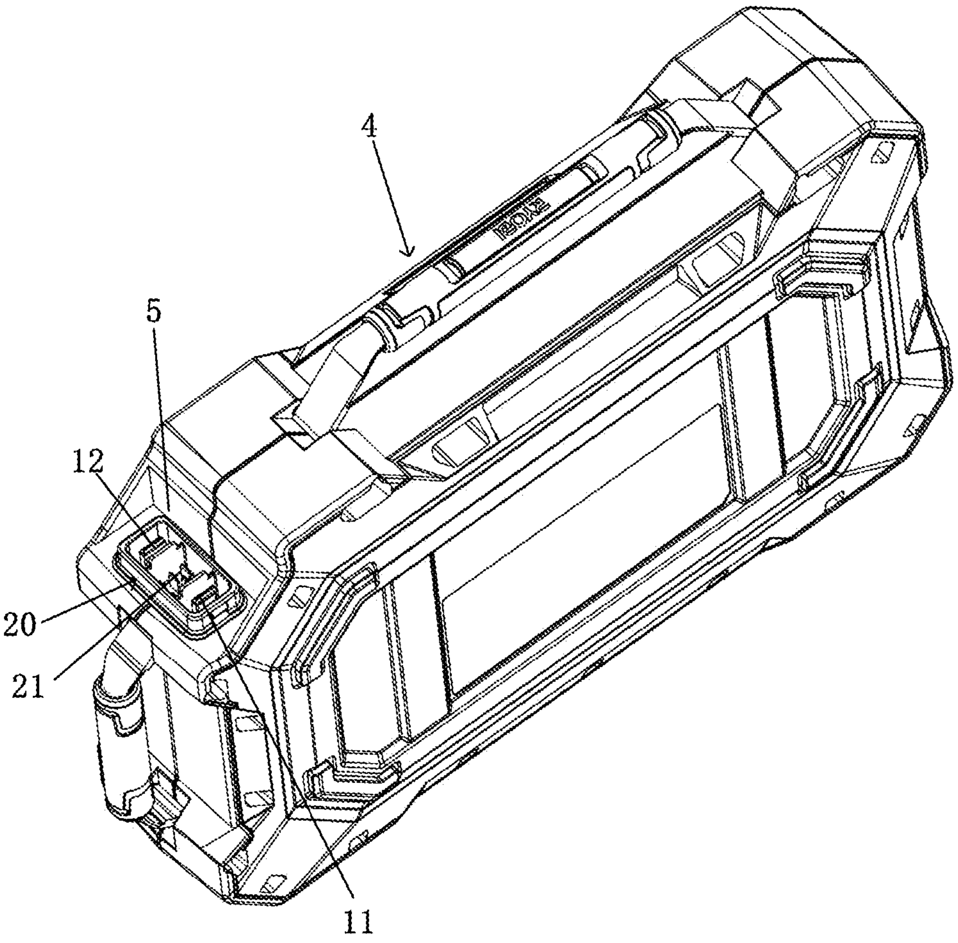
FIG. 5 is a schematic 3D structural drawing of an electrical device, e.g. battery apparatus, of an electrical connection protection system according to an embodiment of the present application, in which the terminal mounting base in FIG. 1 is shown as being disposed on the battery apparatus.

In addition, to facilitate communicative connection between the power supply apparatus and the electrical device, in some embodiments, referring to FIG. 5, the first connection end and second connection end respectively comprise signal terminals 21 capable of contacting each other to realize a communicative connection, wherein the positive pole terminals 12 contact each other and the negative pole terminals 11 contact each other before the signal terminals 21 contact each other. Thus, when the respective signal terminals 21 of the power supply apparatus and the electrical device contact each other, this can realize the communicative connection required between the power supply apparatus and the electrical device; furthermore, because the signal terminals contact each other after electrification, protection for the signal terminals 21 can be increased. Thus, at the same time as power is supplied, the transmission of various signals such as control signals and detection signals between the electrical device and the battery apparatus can be realized. In some embodiments, it is also possible for the positive pole terminals 12 to contact each other at the same time as the signal terminals 21 contact each other.

Figure 2:
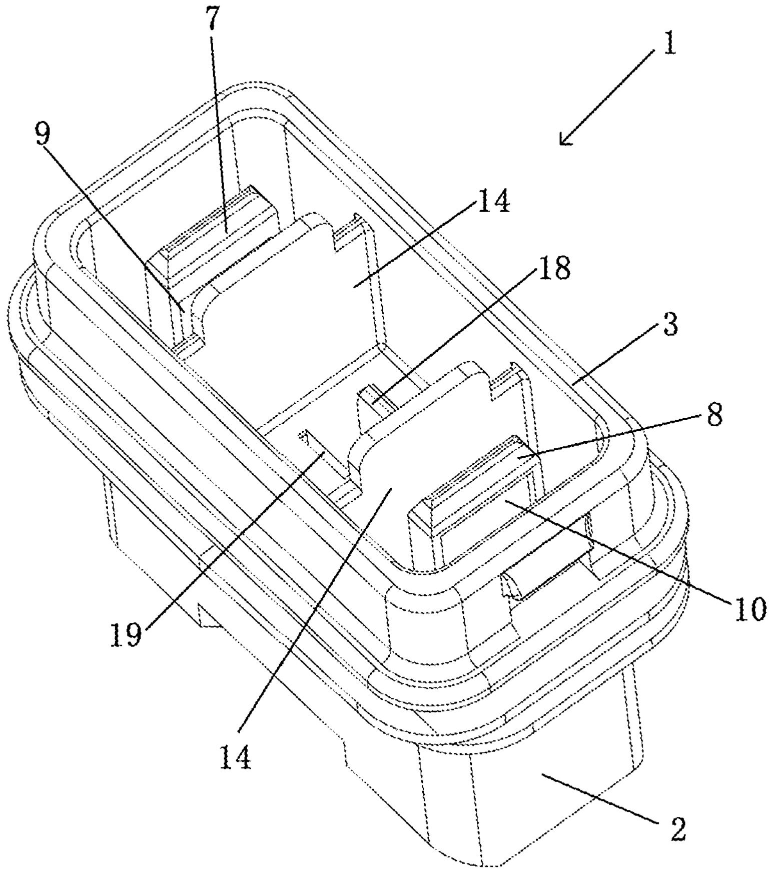
FIG. 2 is a schematic 3D structural drawing of the terminal mounting base in FIG. 1, viewed from another angle.

Furthermore, in some embodiments, referring to FIGS. 2 and 5, to increase protection for the signal terminal 21, the first connection end and/or second connection end comprise(s) a signal terminal mounting zone 13 enclosed by an isolating sidewall; the signal terminal mounting zone 13 is located between the positive pole terminal 12 and the negative pole terminal 11, and the signal terminal 21 is disposed in the signal terminal mounting zone 13. Thus, because the isolating sidewall isolates the signal terminal mounting zone 13 from the positive pole terminal 12 and the negative pole terminal 11, protection for the signal terminal 21 can be effectively increased.

Furthermore, in some embodiments, the respective negative pole terminals 11 and positive pole terminals 12 of the first connection end and second connection end can project directly from housings of the first connection end and second connection end. Alternatively, in other embodiments, the first connection end and second connection end may comprise a separate terminal mounting base 1, the terminal mounting base 1 being mounted on the first connection end and the second connection end. Thus, referring to FIGS. 1, 2, 3 and 4, at least one of the first connection end and second connection end comprises a terminal mounting base 1, with the negative pole terminal 11 and the positive pole terminal 12 disposed on the terminal mounting base 1, wherein the negative pole terminal 11 has a greater height than the positive pole terminal 12. Thus, the negative pole terminal 11, positive pole terminal 12 and terminal mounting base 1 may serve as an independent terminal module; in use, all that need be done is to mount the terminal mounting base 1 on the first connection end and/or second connection end. When the negative pole terminal 11 and/or the positive pole terminal 12 suffers a fault and needs to be replaced, all that need be done is to replace the terminal module with a new one.

Furthermore, in some embodiments, the negative pole terminal 11 and the positive pole terminal 12 may project directly from the terminal mounting base 1. Alternatively, in other embodiments, referring to FIGS. 1 and 2, the terminal mounting base 1 comprises a positive pole terminal mounting insulative member 7 and a negative pole terminal mounting insulative member 8 which are spaced apart; the positive pole terminal mounting insulative member 7 has a positive pole terminal accommodating part 9 allowing the positive pole terminal to be exposed, and the negative pole terminal mounting insulative member 8 has a negative pole terminal accommodating part 10 allowing the negative pole terminal to be exposed. In a terminal plug-in direction, the negative pole terminal accommodating part 10 is higher than the positive pole terminal accommodating part 9. Thus, the positive pole terminal 12 is disposed at the positive pole terminal accommodating part 9 and exposed, and the negative pole terminal 11 is disposed at the negative pole terminal accommodating part 10 and exposed; because the negative pole terminal accommodating part 10 is higher than the positive pole terminal accommodating part 9 in the terminal plug-in direction, the negative pole terminal 11 will be higher than the positive pole terminal 12 at this time, so when the first connection end and second connection end are connected, the negative pole terminals 11 will contact each other before the positive pole terminals 12.

Furthermore, in some embodiments, referring to FIGS. 1 and 2, the terminal mounting base 1 comprises a connecting part 2 and a port part 3, wherein the connecting part 2 is configured to be connectable to a housing 5 of the power supply apparatus so that the port part 3 forms an external connection port of the power supply apparatus; the port part 3 comprises a mounting face 6, and the positive pole terminal mounting insulative member 7 and negative pole terminal mounting insulative member 8 are spaced apart on the mounting face 6. Thus, the connecting part 2 may be mounted on the housing 5 of the power supply apparatus, such that the port part 3 serves as an external connection port of the power supply apparatus; for example, the connecting part 2 may be mounted on the housing 5 of the battery apparatus, such that the port part 3 serves as an external connection port of the battery apparatus, for connection to a charger or electric tool.

Furthermore, the positive pole terminal mounting insulative member 7 and negative pole terminal mounting insulative member 8 may have various structural forms. For example, in one structural form, the positive pole terminal mounting insulative member 7 may be a positive pole terminal mounting cylinder, with an interior space of the positive pole terminal mounting cylinder forming the positive pole terminal accommodating part 9, and the negative pole terminal mounting insulative member 8 may be a negative pole terminal mounting cylinder, with an interior space of the negative pole terminal mounting cylinder forming the negative pole terminal accommodating part 10; openings are respectively formed in sidewalls of the positive pole terminal mounting cylinder and negative pole terminal mounting cylinder, and the negative pole terminal 11 and positive pole terminal 12 may be respectively disposed in the respectively corresponding cylinders and exposed through the respectively corresponding openings to realize electrical connections. Alternatively, in another structural form, referring to FIGS. 1 and 2, the negative pole terminal accommodating part 10 is a negative pole terminal accommodating slot formed on an outer surface of the negative pole terminal mounting insulative member 8, the mounting face 6 is provided with a penetration socket (not shown) corresponding to the negative pole terminal accommodating slot in the terminal plug-in direction, and the negative pole terminal 11 penetrates the negative pole terminal penetration socket, e.g. the plate-like negative pole terminal 11 may for example pass through the penetration socket in an upward direction from below the port part 3 (e.g. in the vertical direction in FIG. 3), so as to pass out through the mounting face 6, be accommodated and positioned in the negative pole terminal accommodating slot, and exposed through a slot mouth of the negative pole terminal accommodating slot. The positive pole terminal accommodating part 9 is a positive pole terminal accommodating slot formed on an outer surface of the positive pole terminal mounting insulative member 7, the mounting face 6 is provided with a penetration socket (not shown) corresponding to the positive pole terminal accommodating slot in the terminal plug-in direction, and the positive pole terminal 12 penetrates the positive pole terminal penetration socket, e.g. the plate-like positive pole terminal 12 may for example pass through the penetration socket in an upward direction from below the port part 3 (e.g. in the vertical direction in FIG. 3), so as to pass out through the mounting face 6, be accommodated and positioned in the positive pole terminal accommodating slot, and exposed through a slot mouth of the positive pole terminal accommodating slot. The slot mouths of the negative pole terminal accommodating slot and positive pole terminal accommodating slot are of larger area, so the area of exposure of the negative pole terminal and positive pole terminal can be increased; for example, entire side surfaces of the positive pole terminal and negative pole terminal can be exposed, thereby increasing the convenience and stability of the respective electrical connections of the negative pole terminal and positive pole terminal.

Figure 3:
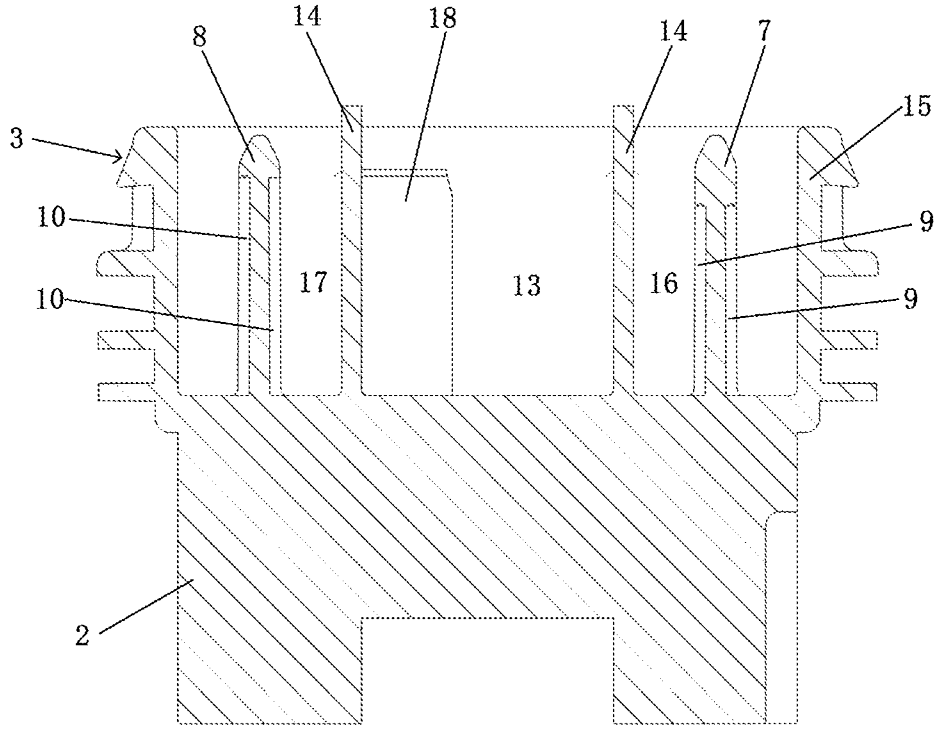
FIG. 3 is a sectional schematic structural drawing of the terminal mounting base in FIG. 1 at one position.
Figure 4:
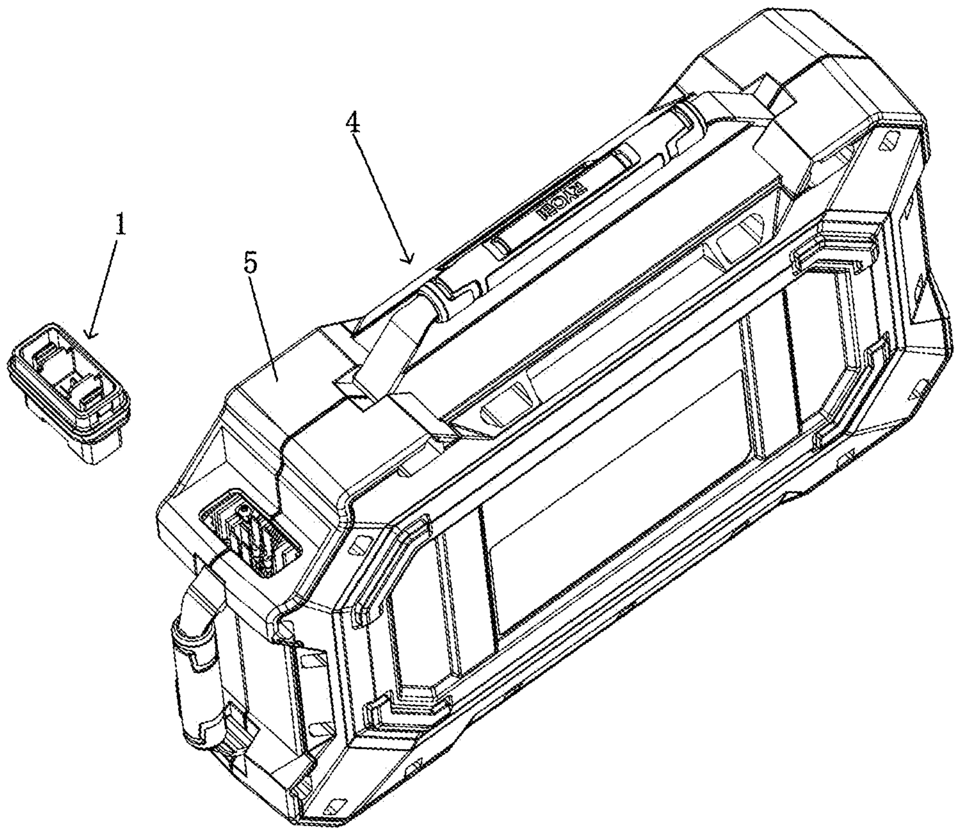
FIG. 4 is a schematic 3D structural drawing of an electrical device, e.g. battery apparatus, of an electrical connection protection system according to an embodiment of the present application, in which the terminal mounting base in FIG. 1 is shown as being removed from the battery apparatus.

Furthermore, in some embodiments, referring to FIGS. 1, 2 and 3, the negative pole terminal mounting insulative member 8 is a negative pole terminal mounting plate to increase the area of the negative pole terminal accommodating slot, and negative pole terminal accommodating slots are respectively formed on two side plate faces of the negative pole terminal mounting plate, such that plate-like negative pole terminals may be respectively provided in the negative pole terminal accommodating slots at the two sides of the negative pole terminal mounting plate. The positive pole terminal mounting insulative member 7 is a positive pole terminal mounting plate to increase the area of the positive pole terminal accommodating slot, and positive pole terminal accommodating slots are respectively formed on two side plate faces of the positive pole terminal mounting plate, such that plate-like positive pole terminals may be respectively provided in the positive pole terminal accommodating slots at the two sides of the positive pole terminal mounting plate. This enables entire side surfaces of the positive pole terminal and negative pole terminal to be exposed, in order to significantly increase the area of exposure of the negative pole terminal and positive pole terminal, thereby increasing the convenience and stability of the respective electrical connections of the negative pole terminal and positive pole terminal. At the same time, the plate-like positive pole terminals at the two sides and the plate-like negative pole terminals at the two sides can effectively increase the stability of the electrical connections.

Furthermore, in the terminal mounting base 1, referring to FIG. 3, in some embodiments, the positive pole terminal mounting insulative member 7 and negative pole terminal mounting insulative member 8 have the same height in the terminal plug-in direction; this can facilitate processing and forming of the two mounting insulative members. Optionally, in other embodiments, the positive pole terminal mounting insulative member 7 and negative pole terminal mounting insulative member 8 may have different heights, e.g. the height of the positive pole terminal mounting insulative member 7 is less than the height of the negative pole terminal mounting insulative member 8.

Furthermore, referring to FIGS. 1 and 2, the mounting face 6 comprises the signal terminal mounting zone 13 located between the positive pole terminal mounting insulative member 7 and negative pole terminal mounting insulative member 8, and the corresponding signal terminal may be mounted in the signal terminal mounting zone 13; as stated above, because the terminal mounting base can prevent an inrush current from arising at the instant when the battery apparatus is connected, protection for the signal terminal disposed in the signal terminal mounting zone 13 can be increased while increasing the practicality of the terminal mounting base.

Furthermore, in some embodiments, the positive pole terminal mounting insulative member 7 and negative pole terminal mounting insulative member 8 may not be provided with an isolating structure. Alternatively, in other embodiments, referring to FIGS. 1 and 2, in some embodiments, the terminal mounting base 1 comprises an isolating plate 14 located between the positive pole terminal 12 and the negative pole terminal 11; for example, the mounting face 6 of the terminal mounting base 1 is provided with the isolating plate 14 located between the positive pole terminal mounting insulative member 7 and negative pole terminal mounting insulative member 8, and the isolating plate 14 isolates the positive pole terminal mounting insulative member 7 from the negative pole terminal mounting insulative member 8. Thus, the isolation provided by the isolating plate 14 can further increase the insulation between the positive pole terminal and the negative pole terminal. Furthermore, if water drips onto the mounting face 6, the water-blocking action of the isolating plate 14 can effectively prevent short-circuiting between the positive pole terminal and the negative pole terminal.

Furthermore, the number of isolating plate(s) 14 may be one, or more than one, for example two; the choice may be made according to actual needs. For example, in some embodiments, referring to FIGS. 1 and 2, the number of isolating plates 14 is two, and these are spaced apart to isolate the positive pole terminal 12 from the negative pole terminal 11; the signal terminal mounting zone 13 of the port part 3 is formed between the two isolating plates 14, and the signal terminal 21 is provided in the signal terminal mounting zone 13. Thus, as stated above, the isolation provided by the isolating plates 14 can further increase the insulation between the positive pole terminal and the signal terminal, and the insulation between the negative pole terminal and the signal terminal.

Furthermore, a sidewall may not be provided on the mounting face 6 in the terminal mounting base 1. Alternatively, in some embodiments, referring to FIGS. 1, 2 and 3, the terminal mounting base 1 comprises an annular sidewall 15 extending in the terminal plug-in direction. For example, the sidewall 15 extending in the terminal plug-in direction is provided in a surrounding manner on the mounting face 6, and the two isolating plates 14 are connected to the sidewall 15 in a plate face extension direction, so that a positive pole zone 16 is formed between the sidewall and one isolating plate 14, and a negative pole zone 17 is formed between the sidewall and the other isolating plate 14, wherein the positive pole terminal mounting insulative member 7 is located in the positive pole zone 16, and the negative pole terminal mounting insulative member 8 is located in the negative pole zone 17. Thus, because two ends of each of the two isolating plates 14 are connected to the sidewall 15 in the plate face extension direction, the strength of the port part 3 can be significantly increased, to facilitate plug-in connection. Furthermore, the sidewall 15 can increase protection for the positive pole terminal, the signal terminal and the negative pole terminal.

Furthermore, referring to FIGS. 1, 2 and 3, a protrusion protruding from the sidewall is formed on a top surface of the isolating plate 14; the protrusion can serve a guiding function during plug-in, to increase the accuracy of plug-in.

In addition, referring to FIGS. 1, 2 and 3, in some embodiments, a positioning plate 18 is formed on a plate face of one isolating plate 14 that faces toward the other isolating plate 14, the positioning plate extending perpendicularly toward the other isolating plate 14. For example, a positioning plate 18 extending toward the isolating plate 14 at the positive pole side is formed on the isolating plate 14 at the negative pole side, with a gap between the positioning plate 18 and the isolating plate 14 at the positive pole side. The positioning plate 18 can isolate signal terminals that need to be isolated among a plurality of signal terminals.

In addition, in the terminal mounting base 1, a variety of types of terminal connection structure may be disposed on the part of the mounting face 6 that is located in the signal terminal mounting zone 13; for example, in one type, the terminal connection structure may be a connecting post. Alternatively, in another type, referring to FIGS. 1 and 2, the terminal connection structure may be a socket. For example, signal terminal sockets 19 located at two sides of the positioning plate 18, and multiple signal terminal sockets 19 spaced apart close to the other isolating plate 14, are formed on the part of the mounting face 6 that is located in the signal terminal mounting zone 13. Thus, through multiple signal terminal sockets 19 arranged in this way, the required signal terminals may be disposed in the corresponding signal terminal sockets 19.

Furthermore, the power supply apparatus is a battery apparatus (referring to FIGS. 4 and 5) and the electrical device is an electric tool, in which case the battery apparatus can supply power to the electric tool; or the power supply apparatus is a charger and the electrical device is a battery apparatus, in which case the charger can charge the battery apparatus; or the power supply apparatus is a power cord and the electrical device is an electric tool, in which case the power cord can supply power to the electric tool directly after connection to a municipal circuit.

In a second aspect, the present invention provides an electrical protection connecting head 20. Referring to FIGS. 1, 2, 3, 4 and 5, the electrical protection connecting head 20 is configured to be able to establish an electrical connection between a power supply apparatus and an electrical device. The electrical protection connecting head comprises a terminal mounting base 1, and a negative pole terminal 11 and a positive pole terminal 12 disposed on the terminal mounting base 1, wherein the negative pole terminal 11 has a greater height than the positive pole terminal 12, so that when an electrical connection is established between the power supply apparatus and the electrical device, the negative pole terminal 11 experiences contact before the positive pole terminal 12.

In this technical solution, because the negative pole terminal 11 disposed on the terminal mounting base 1 has a greater height than the positive pole terminal 12, once the electrical protection connecting head has been disposed on the power supply apparatus and/or the electrical device, the negative pole terminal 11 will experience contact before the positive pole terminal 12 when an electrical connection is established between the power supply apparatus and the electrical device. This can prevent an inrush current from arising at the instant when the power supply apparatus and the electrical device are connected, in order to prevent damage to internal electrical components of the electrical device and the power supply apparatus. For example, damage to the respective signal terminals in the battery connection port and the battery apparatus can be prevented, thus increasing the safety and service life of the power supply apparatus and electrical device, e.g. the battery apparatus and electric tool.

Furthermore, the electrical protection connecting head may serve as an independent product; in use, all that need be done is to mount the terminal mounting base 1 on the power supply apparatus and/or the electrical device. When the negative pole terminal 11 and/or the positive pole terminal 12 suffer(s) a fault and need(s) to be replaced, all that need be done is to replace the electrical protection connecting head with a new one, so maintenance costs are effectively reduced.

In the electrical protection connecting head, the negative pole terminal 11 and the positive pole terminal 12 may project from the terminal mounting base 1 directly. Alternatively, in other embodiments, referring to FIGS. 1 and 2, the terminal mounting base 1 comprises a positive pole terminal mounting insulative member 7 and a negative pole terminal mounting insulative member 8 which are spaced apart; the positive pole terminal mounting insulative member 7 has a positive pole terminal accommodating part 9 allowing the positive pole terminal to be exposed, and the negative pole terminal mounting insulative member 8 has a negative pole terminal accommodating part 10 allowing the negative pole terminal to be exposed. In a terminal plug-in direction, the negative pole terminal accommodating part 10 is higher than the positive pole terminal accommodating part 9. Thus, the positive pole terminal 12 is disposed at the positive pole terminal accommodating part 9 and exposed, and the negative pole terminal 11 is disposed at the negative pole terminal accommodating part 10 and exposed; because the negative pole terminal accommodating part 10 is higher than the positive pole terminal accommodating part 9 in the terminal plug-in direction, the negative pole terminal 11 will be higher than the positive pole terminal 12 at this time, so when the first connection end and second connection end are connected, the negative pole terminals 11 will contact each other before the positive pole terminals 12.

In the electrical protection connecting head, in some embodiments, referring to FIGS. 1 and 2, the terminal mounting base 1 comprises a connecting part 2 and a port part 3, wherein the connecting part 2 is configured to be connectable to a housing 5 of the power supply apparatus so that the port part 3 forms an external connection port of the power supply apparatus; the port part 3 comprises a mounting face 6, and the positive pole terminal mounting insulative member 7 and negative pole terminal mounting insulative member 8 are spaced apart on the mounting face 6. Thus, the connecting part 2 may be mounted on the housing 5 of the power supply apparatus, such that the port part 3 serves as an external connection port of the power supply apparatus; for example, the connecting part 2 may be mounted on the housing 5 of the battery apparatus, such that the port part 3 serves as an external connection port of the battery apparatus 4 (referring to FIG. 5), for connection to a charger or electric tool.

In the electrical protection connecting head, the positive pole terminal mounting insulative member 7 and negative pole terminal mounting insulative member 8 may have various structural forms. For example, in one structural form, the positive pole terminal mounting insulative member 7 may be a positive pole terminal mounting cylinder, with an interior space of the positive pole terminal mounting cylinder forming the positive pole terminal accommodating part 9, and the negative pole terminal mounting insulative member 8 may be a negative pole terminal mounting cylinder, with an interior space of the negative pole terminal mounting cylinder forming the negative pole terminal accommodating part 10; openings are respectively formed in sidewalls of the positive pole terminal mounting cylinder and negative pole terminal mounting cylinder, and the negative pole terminal 11 and positive pole terminal 12 may be respectively disposed in the respectively corresponding cylinders and exposed through the respectively corresponding openings to realize electrical connections. Alternatively, in another structural form, referring to FIGS. 1 and 2, the negative pole terminal accommodating part 10 is a negative pole terminal accommodating slot formed on an outer surface of the negative pole terminal mounting insulative member 8, the mounting face 6 is provided with a penetration socket (not shown) corresponding to the negative pole terminal accommodating slot in the terminal plug-in direction, and the negative pole terminal 11 penetrates the negative pole terminal penetration socket, e.g. the plate-like negative pole terminal 11 may for example pass through the penetration socket in an upward direction from below the port part 3 (e.g. in the vertical direction in FIG. 3), so as to pass out through the mounting face 6, be accommodated and positioned in the negative pole terminal accommodating slot, and exposed through a slot mouth of the negative pole terminal accommodating slot. The positive pole terminal accommodating part 9 is a positive pole terminal accommodating slot formed on an outer surface of the positive pole terminal mounting insulative member 7, the mounting face 6 is provided with a penetration socket (not shown) corresponding to the positive pole terminal accommodating slot in the terminal plug-in direction, and the positive pole terminal 12 penetrates the positive pole terminal penetration socket, e.g. the plate-like positive pole terminal 12 may for example pass through the penetration socket in an upward direction from below the port part 3 (e.g. in the vertical direction in FIG. 3), so as to pass out through the mounting face 6, be accommodated and positioned in the positive pole terminal accommodating slot, and exposed through a slot mouth of the positive pole terminal accommodating slot. The slot mouths of the negative pole terminal accommodating slot and positive pole terminal accommodating slot are of larger area, so the area of exposure of the negative pole terminal and positive pole terminal can be increased; for example, entire side surfaces of the positive pole terminal and negative pole terminal can be exposed, thereby increasing the convenience and stability of the respective electrical connections of the negative pole terminal and positive pole terminal.

In the electrical protection connecting head, in some embodiments, referring to FIGS. 1, 2 and 3, the negative pole terminal mounting insulative member 8 is a negative pole terminal mounting plate to increase the area of the negative pole terminal accommodating slot, and negative pole terminal accommodating slots are respectively formed on two side plate faces of the negative pole terminal mounting plate, such that plate-like negative pole terminals may be respectively provided in the negative pole terminal accommodating slots at the two sides of the negative pole terminal mounting plate. The positive pole terminal mounting insulative member 7 is a positive pole terminal mounting plate to increase the area of the positive pole terminal accommodating slot, and positive pole terminal accommodating slots are respectively formed on two side plate faces of the positive pole terminal mounting plate, such that plate-like positive pole terminals may be respectively provided in the positive pole terminal accommodating slots at the two sides of the positive pole terminal mounting plate. This enables entire side surfaces of the positive pole terminal and negative pole terminal to be exposed, in order to significantly increase the area of exposure of the negative pole terminal and positive pole terminal, thereby increasing the convenience and stability of the respective electrical connections of the negative pole terminal and positive pole terminal. At the same time, the plate-like positive pole terminals at the two sides and the plate-like negative pole terminals at the two sides can effectively increase the stability of the electrical connections.

In the electrical protection connecting head, referring to FIG. 3, in some embodiments, the positive pole terminal mounting insulative member 7 and negative pole terminal mounting insulative member 8 have the same height in the terminal plug-in direction; this can facilitate processing and forming of the two mounting insulative members. Optionally, in other embodiments, the positive pole terminal mounting insulative member 7 and negative pole terminal mounting insulative member 8 may have different heights, e.g. the height of the positive pole terminal mounting insulative member 7 is less than the height of the negative pole terminal mounting insulative member 8.

In the electrical protection connecting head, referring to FIGS. 1 and 2, the mounting face 6 comprises the signal terminal mounting zone 13 located between the positive pole terminal mounting insulative member 7 and negative pole terminal mounting insulative member 8, and the corresponding signal terminal may be mounted in the signal terminal mounting zone 13; as stated above, because the terminal mounting base can prevent an inrush current from arising at the instant when the battery apparatus is connected, protection for the signal terminal disposed in the signal terminal mounting zone 13 can be increased while increasing the practicality of the terminal mounting base.

In the electrical protection connecting head, in some embodiments, the positive pole terminal mounting insulative member 7 and negative pole terminal mounting insulative member 8 may not be provided with an isolating structure. Alternatively, in other embodiments, referring to FIGS. 1 and 2, in some embodiments, the terminal mounting base 1 comprises an isolating plate 14 located between the positive pole terminal 12 and the negative pole terminal 11; for example, the mounting face 6 of the terminal mounting base 1 is provided with the isolating plate 14 located between the positive pole terminal mounting insulative member 7 and negative pole terminal mounting insulative member 8, and the isolating plate 14 isolates the positive pole terminal mounting insulative member 7 from the negative pole terminal mounting insulative member 8. Thus, the isolation provided by the isolating plate 14 can further increase the insulation between the positive pole terminal and the negative pole terminal. Furthermore, if water drips onto the mounting face 6, the water-blocking action of the isolating plate 14 can effectively prevent short-circuiting between the positive pole terminal and the negative pole terminal.

In the electrical protection connecting head, the number of isolating plate(s) 14 may be one, or more than one, for example two; the choice may be made according to actual needs. For example, in some embodiments, referring to FIGS. 1 and 2, the number of isolating plates 14 is two, and these are spaced apart to isolate the positive pole terminal 12 from the negative pole terminal 11; the signal terminal mounting zone 13 of the port part 3 is formed between the two isolating plates 14, and the signal terminal 21 is provided in the signal terminal mounting zone 13. Thus, as stated above, the isolation provided by the isolating plates 14 can further increase the insulation between the positive pole terminal and the signal terminal, and the insulation between the negative pole terminal and the signal terminal.

Furthermore, a sidewall may not be provided on the mounting face 6 in the terminal mounting base 1. Alternatively, in some embodiments, referring to FIGS. 1, 2 and 3, the terminal mounting base 1 comprises an annular sidewall 15 extending in the terminal plug-in direction. For example, the sidewall 15 extending in the terminal plug-in direction is provided in a surrounding manner on the mounting face 6, and the two isolating plates 14 are connected to the sidewall 15 in a plate face extension direction, so that a positive pole zone 16 is formed between the sidewall and one isolating plate 14, and a negative pole zone 17 is formed between the sidewall and the other isolating plate 14, wherein the positive pole terminal mounting insulative member 7 is located in the positive pole zone 16, and the negative pole terminal mounting insulative member 8 is located in the negative pole zone 17, so that the positive pole terminal 12 is located in the positive pole zone 16, and the negative pole terminal 11 is located in the negative pole zone 17. Thus, because two ends of each of the two isolating plates 14 are connected to the sidewall in the plate face extension direction, the strength of the port part 3 can be significantly increased, to facilitate plug-in connection. Furthermore, the sidewall 15 can increase protection for the positive pole terminal, the signal terminal and the negative pole terminal.

In the electrical protection connecting head, referring to FIGS. 1, 2 and 3, a protrusion protruding from the sidewall is formed on a top surface of the isolating plate 14; the protrusion can serve a guiding function during plug-in, to increase the accuracy of plug-in.

In the electrical protection connecting head, referring to FIGS. 1, 2 and 3, in some embodiments, a positioning plate 18 is formed on a plate face of one isolating plate 14 that faces toward the other isolating plate 14, the positioning plate extending perpendicularly toward the other isolating plate 14. For example, a positioning plate 18 extending toward the isolating plate 14 at the positive pole side is formed on the isolating plate 14 at the negative pole side, with a gap between the positioning plate 18 and the isolating plate 14 at the positive pole side. The positioning plate 18 can isolate signal terminals that need to be isolated among a plurality of signal terminals.

In the electrical protection connecting head, a variety of types of terminal connection structure may be disposed on the part of the mounting face 6 that is located in the signal terminal mounting zone 13; for example, in one type, the terminal connection structure may be a connecting post. Alternatively, in another type, referring to FIGS. 1 and 2, the terminal connection structure may be a socket. For example, signal terminal sockets 19 located at two sides of the positioning plate 18, and multiple signal terminal sockets 19 spaced apart close to the other isolating plate 14, are formed on the part of the mounting face 6 that is located in the signal terminal mounting zone 13. Thus, through multiple signal terminal sockets 19 arranged in this way, the required signal terminals may be disposed in the corresponding signal terminal sockets 19.

In a third aspect, the present invention provides an electrical device, which is provided with any of the electrical protection connecting heads in the second aspect above. As stated above, because an inrush current is prevented, the safety and service life of the electrical device, e.g. electric tool are increased, such that the overall quality of the electrical device is favorably improved. The electrical device may be an electric tool or another device that uses electricity.

In a fourth aspect, the present invention provides a power supply apparatus, which is provided with any of the electrical protection connecting heads in the second aspect above. As stated above, because an inrush current is prevented, the safety and service life of the power supply apparatus, e.g. battery apparatus are increased, such that the overall quality of the power supply apparatus is favorably improved. The power supply apparatus is a battery apparatus or a charger.

Although the present invention has been described in detail with reference to some preferred embodiments, changes and modifications exist within the scope and spirit of one or more independent aspects of the present invention described. In addition, those skilled in the art will understand that all of the embodiments above are demonstrative, not restrictive. Different technical features appearing in different embodiments may be combined to obtain beneficial effects. Based on a study of the drawings, description and claims, those skilled in the art will be able to understand and implement other variants of the disclosed embodiments. If certain technical features appear in different dependent claims, this does not mean that these technical features cannot be combined to obtain beneficial effects.

The invention claimed is:

1. An electrical connection protection system, comprising a first connection end for a power supply apparatus and a second connection end for an electrical device, the first connection end and the second connection end respectively comprising positive pole terminals capable of contacting each other to establish an electrical connection and negative pole terminals capable of contacting each other to establish an electrical connection, wherein when the first connection end and the second connection end are connected, the negative pole terminals of the first connection end and the second connection end contact each other before the positive pole terminals of the first connection end and the second connection end;

wherein at least one of the first connection end and the second connection end includes a terminal mounting base, with the negative pole terminal and the positive pole terminal disposed on the terminal mounting base, wherein the negative pole terminal has a greater height than the positive pole terminal; and wherein the terminal mounting base includes a positive pole terminal mounting insulative member and a negative pole terminal mounting insulative member which are spaced apart; the positive pole terminal mounting insulative member has a positive pole terminal accommodating part allowing the positive pole terminal to be exposed, and the negative pole terminal mounting insulative member has a negative pole terminal accommodating part allowing the negative pole terminal to be exposed, the negative pole terminal accommodating part being higher than the positive pole terminal accommodating part in a terminal plug-in direction.

2. The electrical connection protection system as claimed in claim 1, wherein the negative pole terminal of the power supply apparatus has a greater height than the positive pole terminal of the power supply apparatus.

3. The electrical connection protection system as claimed in claim 1, wherein the first connection end and the second connection end respectively comprise signal terminals capable of contacting each other to realize a communicative connection, wherein the positive pole terminals contact each other and the negative pole terminals contact each other before the signal terminals contact each other.

4. The electrical connection protection system as claimed in claim 3, wherein the first connection end and/or the second connection end comprise(s) a signal terminal mounting zone enclosed by an isolating sidewall; the signal terminal mounting zone is located between the positive pole terminal and the negative pole terminal, and the signal terminal is disposed in the signal terminal mounting zone.

5. The electrical connection protection system as claimed in claim 1, wherein the terminal mounting base comprises a connecting part and a port part, wherein the connecting part is configured to be connectable to a housing of the power supply apparatus so that the port part forms an external connection port of the power supply apparatus; the port part comprises a mounting face, and the positive pole terminal mounting insulative member and the negative pole terminal mounting insulative member are spaced apart on the mounting face.

6. The electrical connection protection system as claimed in claim 5, wherein the negative pole terminal accommodating part is a negative pole terminal accommodating slot formed on an outer surface of the negative pole terminal mounting insulative member, the mounting face is provided with a negative pole terminal penetration socket corresponding to the negative pole terminal accommodating slot in the terminal plug-in direction, and the negative pole terminal penetrates the negative pole terminal penetration socket;

the positive pole terminal accommodating part is a positive pole terminal accommodating slot formed on an outer surface of the positive pole terminal mounting insulative member, the mounting face is provided with a positive pole terminal penetration socket corresponding to the positive pole terminal accommodating slot in the terminal plug-in direction, and the positive pole terminal penetrates the positive pole terminal penetration socket.

7. The electrical connection protection system as claimed in claim 6, wherein the negative pole terminal mounting insulative member is a negative pole terminal mounting plate, and the negative pole terminal accommodating slots are respectively formed on two side plate faces of the negative pole terminal mounting plate;

the positive pole terminal mounting insulative member is a positive pole terminal mounting plate, and the positive pole terminal accommodating slots are respectively formed on two side plate faces of the positive pole terminal mounting plate, wherein the positive pole terminal mounting insulative member and the negative pole terminal mounting insulative member have the same height in the terminal plug-in direction.

8. The electrical connection protection system as claimed in claim 1, wherein the terminal mounting base comprises isolating plates located between the positive pole terminal and the negative pole terminal; the number of the isolating plates is two, and these are spaced apart to isolate the positive pole terminal from the negative pole terminal, wherein a signal terminal mounting zone is formed between the two isolating plates, and the signal terminal is provided in the signal terminal mounting zone.

9. The electrical connection protection system as claimed in claim 8, wherein the terminal mounting base comprises an annular sidewall extending in the terminal plug-in direction; the two isolating plates are connected to the sidewall at two ends in a plate face extension direction, so that a positive pole zone is formed between the sidewall and one of the isolating plates, and a negative pole zone is formed between the sidewall and the other isolating plate, wherein the positive pole terminal is located in the positive pole zone, and the negative pole terminal is located in the negative pole zone.

10. The electrical connection protection system as claimed in claim 8, wherein a positioning plate is formed on a plate face of one of the isolating plates that faces toward the other isolating plate, the positioning plate extending perpendicularly toward the other isolating plate, wherein signal terminal sockets located at two sides of the positioning plate, and multiple signal terminal sockets spaced apart close to the other isolating plate, are formed in the signal terminal mounting zone.

11. The electrical connection protection system as claimed in claim 1, wherein the power supply apparatus is a battery apparatus and the electrical device is an electric tool; or the power supply apparatus is a charger and the electrical device is a battery apparatus; or the power supply apparatus is a power cord and the electrical device is an electric tool.

12. An electrical protection connecting head, wherein the electrical protection connecting head is configured to be able to establish an electrical connection between a power supply apparatus and an electrical device; the electrical protection connecting head comprises a terminal mounting base, and a negative pole terminal and a positive pole terminal disposed on the terminal mounting base, wherein the negative pole terminal has a greater height than the positive pole terminal, so that when an electrical connection is established between the power supply apparatus and the electrical device, the negative pole terminal experiences contact before the positive pole terminal;

wherein the terminal mounting base comprises a positive pole terminal mounting insulative member and a negative pole terminal mounting insulative member which are spaced apart; the positive pole terminal mounting insulative member has a positive pole terminal accommodating part allowing the positive pole terminal to be exposed, and the negative pole terminal mounting insulative member has a negative pole terminal accommodating part allowing the negative pole terminal to be exposed, the negative pole terminal accommodating part being higher than the positive pole terminal accommodating part in a terminal plug-in direction.

13. The electrical protection connecting head as claimed in claim 12, wherein the terminal mounting base comprises a connecting part and a port part, wherein the connecting part is configured to be connectable to a housing of the power supply apparatus so that the port part forms an external connection port of the power supply apparatus; the port part includes a mounting face, and the positive pole terminal mounting insulative member and the negative pole terminal mounting insulative member are spaced apart on the mounting face.

14. The electrical protection connecting head as claimed in claim 13, wherein the negative pole terminal accommodating part is a negative pole terminal accommodating slot formed on an outer surface of the negative pole terminal mounting insulative member, the mounting face is provided with a negative pole terminal penetration socket corresponding to the negative pole terminal accommodating slot in the terminal plug-in direction, and the negative pole terminal penetrates the negative pole terminal penetration socket;

the positive pole terminal accommodating part is a positive pole terminal accommodating slot formed on an outer surface of the positive pole terminal mounting insulative member, the mounting face is provided with a positive pole terminal penetration socket corresponding to the positive pole terminal accommodating slot in the terminal plug-in direction, and the positive pole terminal penetrates the positive pole terminal penetration socket.

15. The electrical protection connecting head as claimed in claim 14, wherein the negative pole terminal mounting insulative member is a negative pole terminal mounting plate, and the negative pole terminal accommodating slots are respectively formed on two side plate faces of the negative pole terminal mounting plate;

the positive pole terminal mounting insulative member is a positive pole terminal mounting plate, and the positive pole terminal accommodating slots are respectively formed on two side plate faces of the positive pole terminal mounting plate, wherein the positive pole terminal mounting insulative member and the negative pole terminal mounting insulative member have the same height in the terminal plug-in direction.

16. The electrical protection connecting head as claimed in claim 12, wherein the terminal mounting base comprises isolating plates located between the positive pole terminal and the negative pole terminal; the number of the isolating plates is two, and these are spaced apart to isolate the positive pole terminal from the negative pole terminal, wherein a signal terminal mounting zone is formed between the two isolating plates.

17. The electrical protection connecting head as claimed in claim 16, wherein the terminal mounting base comprises an annular sidewall extending in the terminal plug-in direction; the two isolating plates are connected to the sidewall at two ends in a plate face extension direction, so that a positive pole zone is formed between the sidewall and one of the isolating plates, and a negative pole zone is formed between the sidewall and the other isolating plate, wherein the positive pole terminal is located in the positive pole zone, and the negative pole terminal is located in the negative pole zone.

18. The electrical protection connecting head as claimed in claim 16, wherein a positioning plate is formed on a plate face of one of the isolating plates that faces toward the other isolating plate, the positioning plate extending perpendicularly toward the other isolating plate, wherein signal terminal sockets located at two sides of the positioning plate, and multiple signal terminal sockets spaced apart close to the other isolating plate, are formed in the signal terminal mounting zone.

19. An electrical device, wherein the electrical device is provided with the electrical protection connecting head as claimed in claim 12.

20. A power supply apparatus, wherein the power supply apparatus is provided with the electrical protection connecting head as claimed in claim 14.

21. The power supply apparatus as claimed in claim 20, wherein the power supply apparatus is a battery apparatus or a charger.

* * * * *